(12) United States Patent
Wystup

(10) Patent No.: US 11,228,266 B2
(45) Date of Patent: Jan. 18, 2022

(54) SYNCHRONOUS MACHINE AND METHOD FOR REGULATING THE ROTATIONAL SPEED OF THE SYNCHRONOUS MACHINE WITHOUT SENSORS

(71) Applicant: ebm-papst Mulfingen GmbH & Co. KG, Mulfingen (DE)

(72) Inventor: Ralph Wystup, Künzelsau (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 59 days.

(21) Appl. No.: 16/672,721

(22) Filed: Nov. 4, 2019

(65) Prior Publication Data
US 2020/0067434 A1  Feb. 27, 2020

Related U.S. Application Data

(63) Continuation of application No. PCT/EP2018/060308, filed on Apr. 23, 2018.

(30) Foreign Application Priority Data

May 16, 2017  (DE) ............... 10 2017 110 646.4

(51) Int. Cl.
  *H02P 6/26*  (2016.01)
  *H02P 6/28*  (2016.01)
(52) U.S. Cl.
  CPC . *H02P 6/26* (2016.02); *H02P 6/28* (2016.02)
(58) Field of Classification Search
  CPC .................................... H02P 6/26; H02P 6/28
  See application file for complete search history.

(56) References Cited

U.S. PATENT DOCUMENTS

| 6,054,823 A | * | 4/2000 | Collings ............... H02H 7/093 318/400.04 |
| 2010/0119386 A1 | | 5/2010 | Krishnamoorthy et al. |

(Continued)

FOREIGN PATENT DOCUMENTS

| CH | 453473 A | 6/1968 |
| DE | 25 04 767 A1 | 8/1975 |

(Continued)

OTHER PUBLICATIONS

Translation has been attached.*

(Continued)

*Primary Examiner* — Zoheb S Imtiaz
(74) *Attorney, Agent, or Firm* — Harness, Dickey & Pierce, P.L.C.

(57) ABSTRACT

A permanent magnet synchronous machine (1) having a rotor (R) and a stator (S). Connection terminals (2) apply a feed alternating voltage with a feed frequency ($f_0$). The permanent magnet synchronous machine (1) has a motor controller (10). The controller (10) has an assembly (11) to detect the terminal voltage on the connection terminals (2) and the current frequency ($f_a$). Also, the controller has an analysis device (12). The analysis device (12) ascertains whether the current frequency ($f_a$) contains a frequency component ($f_r$) with a frequency that deviates from the feed frequency ($f_0$).

8 Claims, 1 Drawing Sheet

(56) References Cited

U.S. PATENT DOCUMENTS

| | | | |
|---|---|---|---|
| 2014/0125262 A1 | 5/2014 | Hart et al. | |
| 2015/0265121 A1* | 9/2015 | Kim | A47L 9/2831 15/319 |
| 2016/0359438 A1* | 12/2016 | Taoka | H02P 6/20 |
| 2019/0181712 A1* | 6/2019 | Aso | H02K 15/12 |

FOREIGN PATENT DOCUMENTS

| | | |
|---|---|---|
| DE | 10028492 A1 * | 6/2000 |
| DE | 201 03 217 U1 | 5/2001 |
| DE | 100 28 492 A1 | 12/2001 |
| DE | 103 32 228 A1 | 2/2005 |
| DE | 10 2016 000 580 A1 | 7/2016 |

OTHER PUBLICATIONS

Index to appendices of the GPTO search report dated Feb. 15, 2018 stating the cited documents for German priority application DE 10 2017 110 646.4.

International Search Report with Written Opinion (in German) dated Jun. 20, 2018 in corresponding PCT International Application No. PCT/EP2018/060308.

* cited by examiner

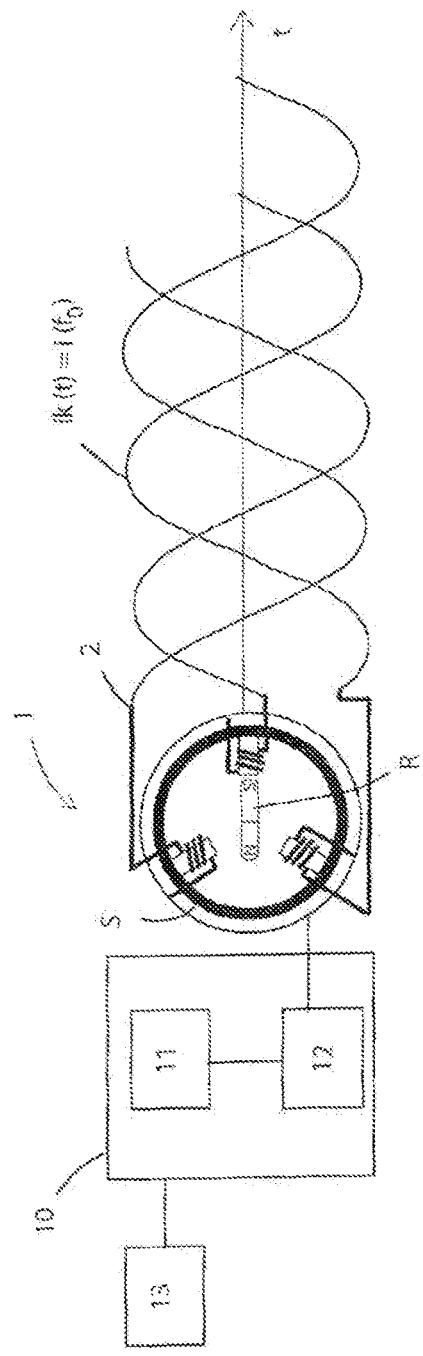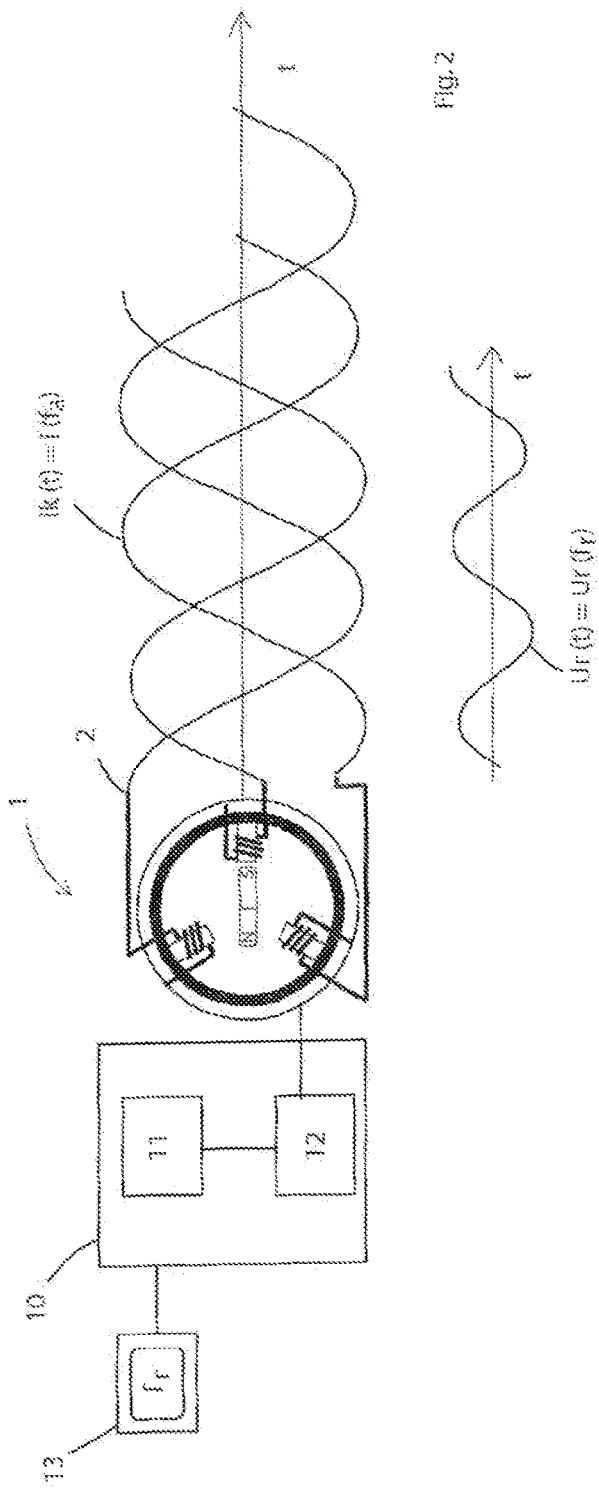

SYNCHRONOUS MACHINE AND METHOD FOR REGULATING THE ROTATIONAL SPEED OF THE SYNCHRONOUS MACHINE WITHOUT SENSORS

CROSS-REFERENCE TO RELATED APPLICATIONS

This application is a continuation of International Application No. PCT/EP2018/060308, filed Apr. 23, 2018, which claims priority to German Application No. 10 2017 110 646.4, filed May 16, 2017. The disclosures of the above applications are incorporating herein by reference.

FIELD

The disclosure relates to a permanent magnet synchronous machine and a method for regulating the rotational speed of such a synchronous machine without sensors.

BACKGROUND

Single-phase synchronous motors are economical to produce and are widely used in different applications. It is known that a single-phase or multi-phase synchronous motor and/or a synchronous machine can be driven by alternating voltage applied to the connection terminals. If such a synchronous machine is loaded, however, beyond a certain torque, it will simply stop after a certain amount of time and/or drop out, which is also characterized as "fall out of synchronization."

In order to start the synchronous motor with supply frequency applied by the supply network, for example, an overrunning clutch can be provided. It is interconnected between the motor shaft and the element driven by the motor shaft. Thus, by the fan wheel or pump wheel.

To this end, the motor shaft populated with permanent magnets has a correspondingly low mass. Thus, it can be started synchronously with the rotating field of the power supply. After the secure magnetic coupling of the motor shaft to the power supply rotating field is complete, the element driven by the single-phase synchronous motor is grasped and carried along by the rotational movement. This occurs by a conveying device in freewheel.

Basically, the single-phase synchronous motor has, however, two possible start-up directions. It has rotation to the left and rotation to the right. Thus, it has a rotational direction probability of about 50% for each direction.

In some application cases, the rotational direction of the synchronous machine is irrelevant. This occurs in pumps that have about the same conveying property for both rotational directions. Also, there are application cases where the rotational direction of the motor is decisive.

In order to influence the desired rotational direction of the single-phase synchronous motor, it is known, for example, to influence the mass moment of inertia, the freewheel angle, or the load torque profile via the angle of rotation. Thus, with the correct running direction, the load affecting the motor shaft is so low. Thus, the motor does not fall out of synchronization to the extent possible. Accordingly, the rotor coupled magnetically into the rotating field provided by the power supply also continues to rotate with its load in the same direction.

In order to prevent the falling out of synchronization, sensors are typically installed. They detect the position of the rotor and readjust the terminal voltage. This occurs via the motor controller by field-oriented control.

Motor controllers and corresponding methods are widely known from the prior art. DE 102016000580 A1 discloses, for example, a motor current controller and a method for controlling the motor current. It is suitable to control a stepper motor.

DE 20103217 U1 discloses a fan motor with frequency control to obtain a constant speed. Particularly, a fan motor compares the signal frequency of an incoming pulse with the frequency of a signal detected by the fan. It modifies the output voltage with the assistance of an integrated differential circuit and a differential amplifier such that the output voltage output to the fan has a smooth waveform. Thus, the fan is precisely maintained at a constant speed.

The disadvantage with the known motors in the prior art, to prevent the fall out of synchronization, is that sensors must be installed. Especially with single-phase synchronous motors, no alternative solution for sensor-linked motor control is known in the prior art.

SUMMARY

Thus, it is an object of the present disclosure is to further develop a synchronous motor. Also, it is desirable to provide a corresponding method so that sensor-free control and particularly the falling out of synchronization, can be prevented in a simple and economical manner.

This object is achieved by a permanent magnet synchronous machine comprising a rotor (R) and a stator (S) formed with connection terminals to apply a feed alternating voltage with a feed frequency ($f_0$). A motor controller includes an assembly for detecting the terminal current on the connection terminals and a current frequency ($f_a$) and an analysis device. The analysis device ascertain whether the current frequency ($f_a$) contains a frequency component ($f_r$) with a frequency that deviates from the feed frequency ($f_0$), and, in particular, if it is a decreasing frequency. The motor controller is formed, as a function of the determined frequency component ($f_r$), to change the amplitude of the terminal voltage.

A basic idea of the present disclosure is based on applying terminal voltage to the phases of a permanent magnet synchronous motor. This enables the motor to rotate synchronously. A synchronous motor can rotate with the supply frequency or a frequency of installed converter electronics without any electronics connected to the power supply. If this motor then falls out of synchronization due to excessive torques, the rotational speed of the rotor slows to a value of "zero". Thus, the rotor remains stopped as a result.

The rotor of a permanent magnet synchronous motor has permanent magnets. However, they induce a voltage in the rotor coil when the rotor decelerates with a frequency that deviates from the excitation frequency, frequency of the excitation voltage.

This voltage induced when the synchronous motor falls out of synchronization consequently generates a frequency component in the terminal current with the specific frequency of the decelerating rotor. According to the disclosure, the terminal current is monitored for a decreasing frequency component with a monitoring device. As soon as a deviating and/or decreasing frequency component is detected in the frequency spectrum, that does not correspond to the frequency of the applied terminal voltage, it can be concluded that the motor is starting to fall out of synchronization.

According to the disclosure, this result can be correspondingly displayed or directly used to recapture the motor. Thus, the frequency of the terminal voltage is adapted to the frequency of the rotor.

According to the disclosure, a permanent magnet synchronous machine is provided with a rotor and a stator formed with connection terminals to apply a supply alternating voltage with a supply frequency $f_0$. The permanent magnet synchronous machine is formed with a motor controller. The motor controller comprises an assembly to detect the terminal current on the connection terminals and the current frequency $f_a$. Furthermore, an analyzer is provided in order to ascertain whether the current frequency contains a frequency component $f_r$, with a frequency that deviates from the supply frequency and in particular that decreases.

In a preferred embodiment, a display device is provided to display a frequency component that deviates from the supply frequency or converter frequency and/or is decreasing.

It is further advantageous when the motor controller is formed, as a function of the determined frequency component, to change the frequency of the terminal voltage and particularly to adapt it to the frequency of the rotor.

It is further advantageous for a design where the motor controller is formed to change the amplitude of the terminal voltage as a function of the determined frequency component. The amplitude of the terminal voltage must also be increased regularly, because the motor has fallen out of synchronization due to an excessive torque. If the frequency of the motor current is permanently monitored and adapted as needed, the motor can always be maintained in synchronization without requiring additional sensors.

The use of the disclosure concept with a single-phase synchronous machine is especially advantageous.

A further aspect of the present disclosure relates to a method for operating a permanent magnet synchronous machine. It includes the steps of:

a. applying supply alternating voltage with a supply frequency to the terminals of the synchronous machine to drive the machine;

b. monitoring the terminal current on the connection terminals and the current frequency; and c. determining whether the current frequency of the motor current contains a frequency component with a frequency that deviates from the feed frequency and particularly that it is decreasing.

In an advantageous manner, the method according to the disclosure is operated so that an adaptation of the frequency and/or of the amplitude of the terminal voltage is carried out as soon as, in step c), it detects a frequency component with a frequency that deviates from the supply frequency or converter frequency (feed frequency) and particularly is decreasing. Especially the detection of a current portion in the terminal voltage with decreasing frequency indicates that the rotor is becoming slower. It is falling out of synchronization. Thus, the frequency of the voltage induced by the permanent magnets decreases accordingly and, that is, to the point of stoppage of the rotor.

Thus, it is especially advantageous to not only detect the change in the frequency but also the dimension, in the form of the frequency. Also, it is desirable to detect the first derivation over time in order to determine how the frequency component changes in order to carry out the corresponding adaptations.

The adaptation of the frequency and/or the amplitude of the terminal voltage, in this case, takes place at a certain operating point so that the rotor continues to rotate at a constant rotational speed.

Other advantageous further embodiments of the disclosure are characterized in the dependent claims and/or are shown in more detail in the following by the figures, along with the description of the preferred embodiment of the disclosure.

DRAWINGS

The drawings described herein are for illustrative purposes only of selected embodiments and not all possible implementations, and are not intended to limit the scope of the present disclosure.

FIG. 1 is a schematic view of an exemplary embodiment of the disclosure.

FIG. 2 is a schematic view of the exemplary embodiment according to FIG. 1 where the frequency of the terminal voltage has changed.

DETAILED DESCRIPTION

The disclosure is explained in more detail in the following with reference to FIGS. 1 and 2. Use of the same reference numerals indicates the same structural and/or functional features.

FIGS. 1 and 2 each show a permanent magnet synchronous machine 1 with a rotor R and a stator S. The stator S is formed with connection terminals 2. The terminals 2 apply a supply alternating voltage or converter voltage with a frequency $f_0$. The permanent magnet synchronous machine 1 is equipped with a motor controller 10. It includes an assembly 11 to detect the terminal current $i_K(t)$ on the connection terminals 2 and the current frequency $f_a$. The motor controller 10 may include a converter.

The analysis device 12 is formed in order to determine whether the current frequency $f_a$ of the terminal current $i_K(t)$ contains a frequency component $f_r$ with a frequency that deviates from the feed frequency $f_0$ and particularly if it is decreasing.

FIG. 2 further shows (only by example) a voltage curve of the induced voltage (Ur(t), which has a lower frequency $f_r$ than the frequency $f_0$. This reflects the decreasing rotational speed of the synchronous machine 1 when out of synchronization.

Furthermore, a display device 13 is provided. It displays a frequency component $f_r$ that deviates from the supply frequency ($f_0$) and/or that it is decreasing. Depending on the determined frequency component $f_r$, the motor controller 10 adapts the frequency and the amplitude of the terminal voltage to the frequency of the rotor R when the motor is fed not by supply voltage but by the converter.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A permanent magnet synchronous machine comprising:
    a rotor (R) and a stator (S) formed with connection terminals for applying a feed alternating voltage with a feed frequency ($f_0$);
    a motor controller including:
        an assembly for detecting the terminal current on the connection terminals and a current frequency ($f_a$) of the terminal current; and
        an analysis device, the analysis device configured to ascertain whether the current frequency ($f_a$) contains a frequency component ($f_r$) with a frequency that deviates from the feed frequency ($f_0$), and whether the frequency component ($f_r$) is a decreasing frequency; and
    the motor controller is configured to, as a function of the determined frequency component ($f_r$), change the amplitude of a terminal voltage when the frequency component ($f_r$) is a decreasing frequency.

2. The permanent magnet synchronous machine according to claim 1, further comprising a display device for displaying the frequency component ($f_r$) that deviates from the feed frequency ($f_0$).

3. The permanent magnet synchronous machine according to claim 1, wherein the motor controller is further configured to change a frequency of the terminal voltage to a frequency of the rotor (R).

4. The permanent magnet synchronous machine according to claim 1, further comprising a converter configured to supply the feed alternating voltage, and the motor controller is configured to change a converter frequency of the converter and to a frequency of the rotor (R).

5. The permanent magnet synchronous machine according to claim 1, wherein the synchronous machine is a single-phase synchronous machine.

6. A method for operating a permanent magnet synchronous machine according to claim 1 including the steps of:
    a. applying the feed alternating voltage with the feed frequency ($f_0$) to the terminals of the synchronous machine;
    b. monitoring the terminal current on the connection terminals and the current frequency ($f_a$); and
    c. determining whether the current frequency ($f_a$) of the terminal current contains the frequency component ($f_r$) with a frequency that deviates from the feed frequency ($f_0$) and whether the frequency component ($f_r$) is decreasing.

7. The method according to claim 6 further comprising adapting at least one of the frequency and the amplitude of the terminal voltage is carried out as soon as, in c), a detection of the frequency component ($f_r$) with a frequency that deviates from the feed frequency ($f_0$) is determined and is decreasing.

8. The method according to claim 7, wherein the adaptation of the at least one of the frequency and the amplitude of the terminal voltage takes place so that the rotor continues to rotate at a constant rotational speed.

* * * * *